I. LANGMUIR.
WIRELESS SIGNALING SYSTEM.
APPLICATION FILED JAN. 29, 1920.
Reissued Nov. 21, 1922. 15,495.
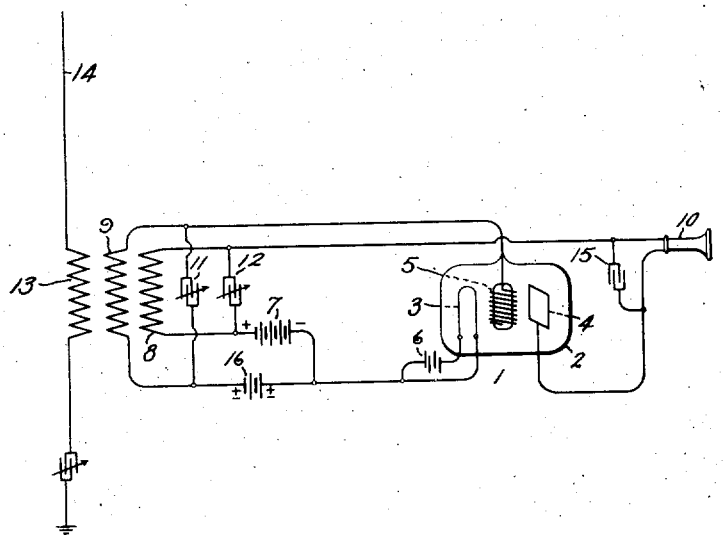
Inventor:
Irving Langmuir,
by Albert G. Davis
His Attorney.

Reissued Nov. 21, 1922.

Re. 15,495

UNITED STATES PATENT OFFICE.

IRVING LANGMUIR, OF SCHENECTADY, NEW YORK, ASSIGNOR TO GENERAL ELECTRIC COMPANY, A CORPORATION OF NEW YORK.

WIRELESS SIGNALING SYSTEM.

Original No. 1,313,093, dated August 12, 1919, Serial No. 83,637, filed March 11, 1916. Application for reissue filed January 29, 1920. Serial No. 354,928.

*To all whom it may concern:*

Be it known that I, IRVING LANGMUIR, a citizen of the United States, residing at Schenectady, in the county of Schenectady, State of New York, have invented certain new and useful Improvements in Wireless Signaling Systems, of which the following is a specification.

My present invention relates to wireless signaling systems, and more particularly to an improvement in the so-called "heterodyne" system of wireless transmission. In this system it has been customary heretofore to provide at the receiving station a source of sustained oscillations having a frequency slightly different from that of the waves used for transmitting the signals which it is desired to receive. Oscillations from this local source have been caused to interact with the waves received from the distant station and produce, in a suitable device, signals, either visual or audible. In case the signals are rendered audible they may take the form of beats having a frequency dependent on the difference in frequency between the received and locally produced oscillations.

Various forms of apparatus for producing audible signals have been suggested. In my Patent 1,280,768, issued October 8, 1918, I have described a system in which the received and locally generated oscillations have been caused to interact and produce beats in a telephone receiver through the medium of an electron discharge device. In this case at least two separate agencies are required to effect the desired result, namely, a device for producing high frequency oscillations and an electron discharge device. I have discovered, however, that if an electron discharge device is used as a source of oscillations it may at the same time serve as the agency through which the two sets of oscillations interact to produce signals.

The novel features which I believe to be characteristic of my invention I have pointed out with particularity in the claims appended hereto. The invention itself, however, both as to the details of its organization and its mode of operation will be best understood by reference to the following description taken in connection with the accompanying drawing in which I have shown a single system of connections whereby the desired result may be accomplished.

In the drawing 1 represents an electron discharge tube which comprises an evacuated tube 2 having a cathode 3, an anode 4, and a conducting body 5 which is preferably in the form of a grid interposed between the cathode and anode. The cathode used in this case is in the form of a filament which may be raised to incandescence by current from any convenient source, as battery 6. The two electrodes are connected by an oscillatory circuit, containing an external source of current 7, which may be a battery, as shown, or any other direct current source, an inductance 8 and an indicating device which in this case takes the form of a telephone receiver 10. The circuit thus formed for convenience of description I call the plate circuit. The cathode is also connected externally with the grid 5 through an inductance 9. The oscillatory circuit thus formed I designate the grid circuit. The two circuits are coupled together by placing the inductance 8 in inductive relation with the inductance 9. With the circuit arrangement shown, if the inductances 8 and 9 are wound in the same direction, when current in the plate circuit begins to build up current tends to flow in the opposite direction in the grid circuit and the grid becomes negatively electrified. This cuts down the flow of current in the plate circuit and as the current decreases the grid loses its negative potential and becomes positive. This allows the current to increase again in the plate circuit. These changes may take place with great rapidity, their frequency depending upon the natural periods of the two circuits. The frequency of the current changes may be readily varied by varying the constants of the two circuits by means of the adjustable condensers 11 and 12 placed respectively in the grid and plate circuits. By this means sustained oscillations of any desired frequency may be obtained in the coil 9 and the frequency may easily be adjusted to a value slightly different from that of the waves which it is desired to receive.

Since an alternating current is produced in coil 13 there will in turn be an alternating potential induced in coil 8 in the plate circuit. Hence the total current in the plate circuit will be the resultant of the current flowing therein from the battery and the oscillatory current produced by this induced potential. The latter component may be so small that the total current in the circuit will always be in the same direction though in some cases it may be so large that there is a reversal in the direction of current flow. In any case, however, the total current may be considered as being made up of two components one of which is an oscillatory current.

Since in most cases it will be desirable to employ frequencies beyond the range of audibility of a telephone receiver, these locally produced current changes will have no effect in the receiver 10. If, however, the coil 9 is connected inductively with coil 13 of the grounded aerial 14, the received oscillations will be impressed upon the grid 5 of the electron discharge tube. These oscillations will produce a rapid variation in the potential of the grid which in turn will produce corresponding variations in the current flowing through the tube. Inasmuch as the frequency of the received oscillations differs from the frequency of the current changes set up locally in the plate circuit there will be certain periods when the two sets of oscillations are in phase with each other when they will act together and produce increased changes in the current flow through the plate circuit. There will also be periods when they are directly opposite in phase and the current changes in the plate circuit will be correspondingly reduced. As a result of this action the current flowing through the telephone receiver 10 instead of having a constant amplitude will have a regularly varying amplitude. Beats will consequently be heard in the receiver, the frequency of these beats being dependent upon the group frequency of the current variations produced in the plate circuit and this group frequency in turn being equal to the difference in frequency of the two sources. With this arrangement the only signals which can be received are those which are transmitted by means of waves which differ in frequency from the locally produced oscillations by an amount which is within the range of audibility of an ordinary telephone receiver. The waves which differ in frequency from the locally produced waves by a greater or less amount than the audible frequency of the receiver will produce no effect.

It will of course be understood that the current flowing in the plate circuit is made up of a large number of rapidly succeeding unidirectional impulses of brief duration. On account of the high frequency of these impulses the inductance of the receiver will tend to choke them back. To prevent this the condenser 15 may be shunted across the terminals of the receiver. In some cases it will be found desirable to employ a battery 16 in the grid circuit in order that normally the grid may have a certain definite potential with respect to the cathode. The amount of this potential will depend upon the design of the tube and upon the desired characteristics of the tube. It may be found advantageous in some cases to make the battery so large that the potential of the grid will always be negative. On the other hand it may be found desirable in some cases to so connect the battery that a positive potential will be imposed upon the grid. It will of course be understood that other suitable forms of current operated devices than a telephone receiver may be used for receiving the signals and in case the current fluctuations produced are not great enough to operate the indicating means, they may be amplified by means of any amplifying device desired.

While I have shown and described only a single organization whereby the desired result may be accomplished, it will be apparent that many modifications may be made without departing from the spirit of my invention. I do not wish to be limited to the particular forms of apparatus indicated as other forms may also be used for the same purpose.

What I claim as new and desire to secure by Letters Patent of the United States, is:—

1. The combination in a wireless receiving system of an antenna, an electron discharge device having resonant plate and grid circuits, inductances in each of said circuits which are coupled to each other whereby local oscillations may be produced of a different frequency from that of the oscillations to be received, and a coil in said antenna which is coupled to both of said inductances.

2. The combination in a wireless receiving system of an antenna, an electron discharge device having resonant plate and grid circuits, a coupling between said circuits whereby local oscillations may be produced of a different frequency from that of the oscillations to be received, and a coupling between each of said circuits and the antenna.

3. The combination in a wireless receiving system of an antenna, an electron discharge device having plate and grid circuits, one of said circuits being resonant. inductances in each of said circuits which are coupled to each other whereby local oscillations may be produced of a different frequency than that of the oscillations to be received and a coil in said antenna which is coupled to both of said inductances.

4. The combination in a wireless receiving system of an antenna, an electron discharge device having plate and grid circuits, one of said circuits being resonant, a coupling between said circuits whereby local oscillations may be produced of a different frequency from that of the oscillations to be received, and a coupling between each of said circuits and the antenna.

In witness whereof, I have hereunto set my hand this 27th day of January, 1920.

IRVING LANGMUIR.